United States Patent [19]

Faivre

[11] 4,217,718
[45] Aug. 19, 1980

[54] APPARATUS FOR CATCHING AND LIFTING LIVE FISH

[76] Inventor: Claude Faivre, 7, rue de l'Industrie, 25110 Baume les Dames, France

[21] Appl. No.: 929,108

[22] Filed: Jul. 31, 1978

[30] Foreign Application Priority Data

Aug. 4, 1977 [FR] France .................. 77 24982
Feb. 24, 1978 [FR] France .................. 78 06552

[51] Int. Cl.² ............................................ A01K 79/00
[52] U.S. Cl. ........................................................ 43/6.5
[58] Field of Search .................. 119/5, 3; 43/6.5; 198/661, 666, 676; 415/71, 72, 73, 74; 405/81, 82, 83; 46/6.5

[56] References Cited

U.S. PATENT DOCUMENTS

| | | | |
|---|---|---|---|
| 1,252,500 | 1/1918 | Schnoor | 119/5 |
| 1,777,783 | 10/1930 | Burns et al. | 43/6.5 |
| 3,768,193 | 10/1973 | London | 43/6.5 |
| 4,086,717 | 5/1978 | Aucoin, Jr. et al. | 43/6.5 |

*Primary Examiner*—Hugh R. Chamblee
*Attorney, Agent, or Firm*—Robert E. Burns; Emmanuel J. Lobato; Bruce L. Adams

[57] ABSTRACT

The apparatus comprises, rotating in a common sheath, a catching screw having a lattice-work helix and extended by a lifting screw whose helix is solid, the two helices are rotated by a single shaft. A deflector is provided at the junction point of the helices to facilitate the free passage of the fish from the lattice-work portion of the helix to the solid portion.

9 Claims, 5 Drawing Figures

U.S. Patent  Aug. 19, 1980  Sheet 2 of 3  4,217,718 ained lifting screw whose helix is solid, the two helices being set in rotation by a single shaft and by the fact that means are provided at the junction point of said helices in order to facilitate the free passage of the fish from the lattice-work portion to the solid portion.

APPARATUS FOR CATCHING AND LIFTING LIVE FISH

FIELD OF INVENTION

The present invention relates to an apparatus intended to remove fish from a breeding tank in order to proceed with operations of sorting, measuring, counting, loading onto a lorry or simply transference from one tank to another. It relates more particularly to an apparatus for catching and lifting live fish, provided with transportation and positioning means.

BACKGROUND OF INVENTION

Various currently used apparatus are known in this field.

In the first place, there is an elevator constituted by a rotating Archimede's screw with a cylinder whose diameter is equal to that of the screw.

An apparatus of this type is bulky, difficult to handle and sucks in a large quantity of water at the same time as the fish. Beyond an angle of 45° with respect to the level of the water, this screw pump runs dry and it is therefore necessary that the cylinder is very long in order to reach a satisfactory useful height. The intake of fish is manual in order to prevent excessively fast rotation of the screw.

A bucket elevator is also known constituted by a conveyor belt provided with battens: it does not operate beyond an angle of 45°, must be operated manually, is heavy and bulky.

One also uses a pump operating at very low pressure and with a high output, a so-called trout pump. Positioning of such a pump requires a considerable amount of time, since it is necessary to install large diameter pipes whilst taking care to reduce pressure losses in the pipe, as far as possible. The fish instinctively fighting against the current will thus attempt to move away from the low pressure suction zone, to which it must be returned by a net constantly reducing the area in which it is able to swim. It will thus undergo traumatisms which will hinder its ultimate development or simply reduce the quality of its flesh if it is eaten shortly after this pumping operation. In any case, the arrival of fish in the pump will be irregular and will take place in surges.

SUMMARY OF THE INVENTION

The invention intends to provide an apparatus making it possible to catch fish in a breeding tank and to lift them to a sufficient height in order that they are able to flow by gravity to the chosen destination without suffering the least damage. Furthermore, an apparatus of this type should be light, compact, able to be put in position quickly by one man, be supplied directly from the breeding tank without any manual intervention other than the progressive movement of a separating net.

To this end, the apparatus according to the invention is characterised by the fact that it comprises, rotating in a common sheath, a catching screw whose helix consists of lattice-work extended by a lifting screw whose helix is solid, the two helices being set in rotation by a single shaft and by the fact that means are provided at the junction point of said helices in order to facilitate the free passage of the fish from the lattice-work portion to the solid portion.

The main advantages of this apparatus reside in its simplicity since a single shaft drives the screw which catches the fish and the screw which lifts the fish. The lattice-work screw does not create any drop in pressure likely to frighten the fish and if the junction point is wisely located with respect to the water level in the tank, the solid screw is able to entrain just the quantity of water necessary for the good behaviour of the fish as they are lifted.

BRIEF DESCRIPTION OF DRAWING

Other advantages will become apparent from the description, given by way of example, of a preferred but non-limiting embodiment and from the drawings in which:

FIGS. 1 and 2 show that the apparatus according to the invention is constituted essentially by the following parts:

Figure 1:
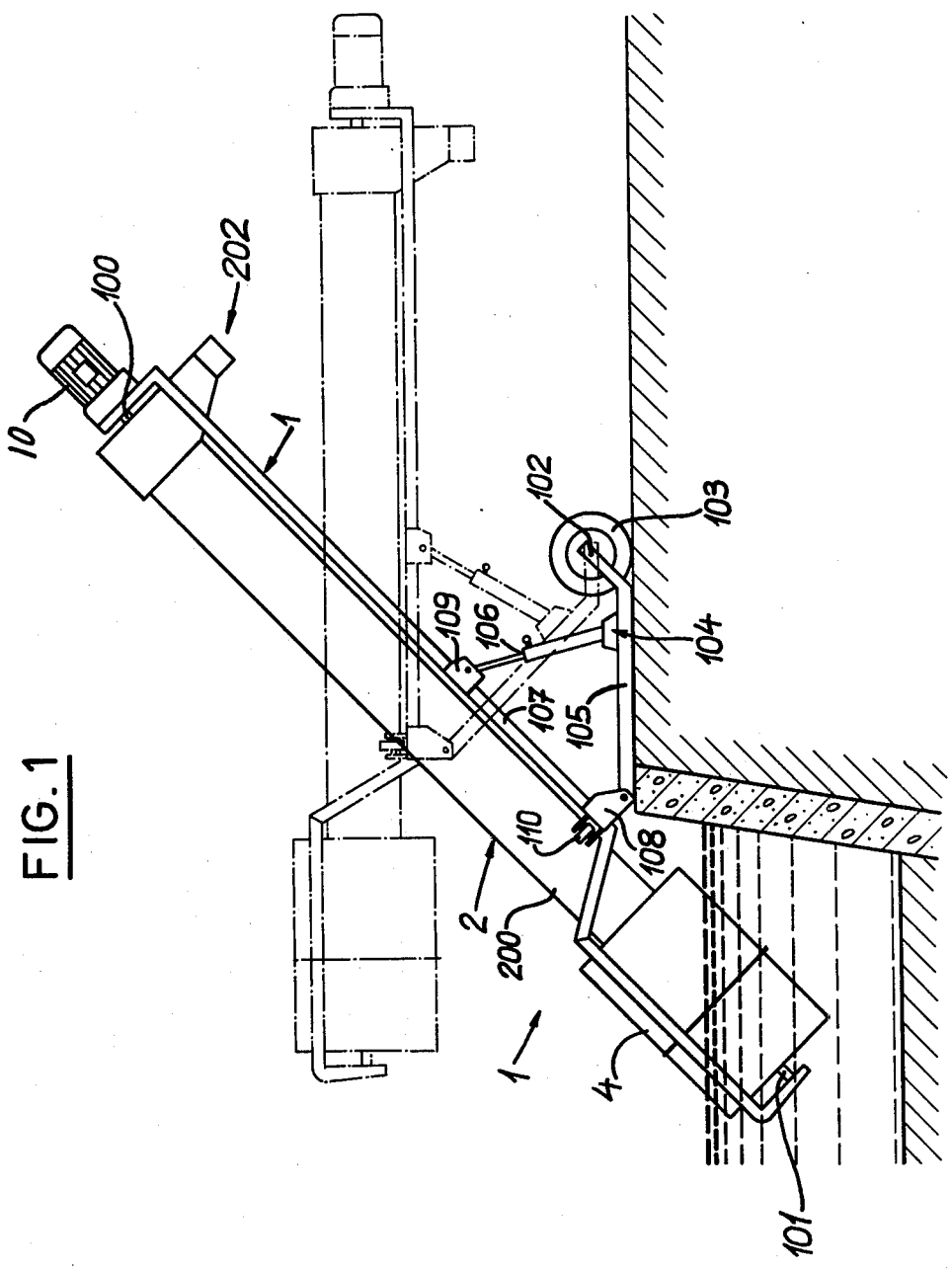
FIG. 1 is a side elevation of one embodiment of apparatus in accordance with the invention.

a frame 1 serving for the transportation and positioning on the edge of the breeding tank;

a lifting screw 2 constituted by a cylindrical sheath 2a inside which is located a solid helix 2b;

a catching screw 3 whose helix consists of lattice-work;

a cylindrical drum 4 protecting the screw 3 and acting as one part of a sheath the other part of which is formed by the cylindrical sheath 2a around the lifting screw;

a shaft 5 common to the two screws which rotates the latter between two bearings located on the frame.

The frame 1 is constituted by tubular members arranged in order to support two bearings 100, 101 between which the shaft 5 rotates and a motor 10 which drives the shaft 5 by means of a speed-reduction unit.

The frame is supported by a transportation and positioning carriage constituted essentially by an axle 102 provided with wheels 103 and, on either side of the screws, two stabilization triangles each of which has an apex 104 close to the axle, a side 105 of invariable length coming to rest on the ground, a side 106, of adjustable length, facilitating the adjustment of the inclination of the screws with respect to the ground, and a base 107 provided at each corner with slides 108, 109 in which the frame slides. The slides 108, 109 make it possible to vary the depth to which the appratus is immersed in the water in a breeding tank.

When the lifting screw exceeds a certain length, according to the lifting requirements, an intermediate bearing provided with rollers 110 (FIG. 1) is located close to the slides 109 in order to relieve the sheath 200 of the lifting screw.

One of the ends of the lifting screw 2 supports the lattice-work screw 3 provided with its drum 4 of transluscent material in order that the fish are not frightened by the darkness which would result from an opaque drum, which darkness would cause them to attempt to swim away and which would make it necessary to tighten the net around the catching apparatus. The upper end of the drum 4 is joined to the cylinder 2a by an annular wall 4a.

Figure 2:
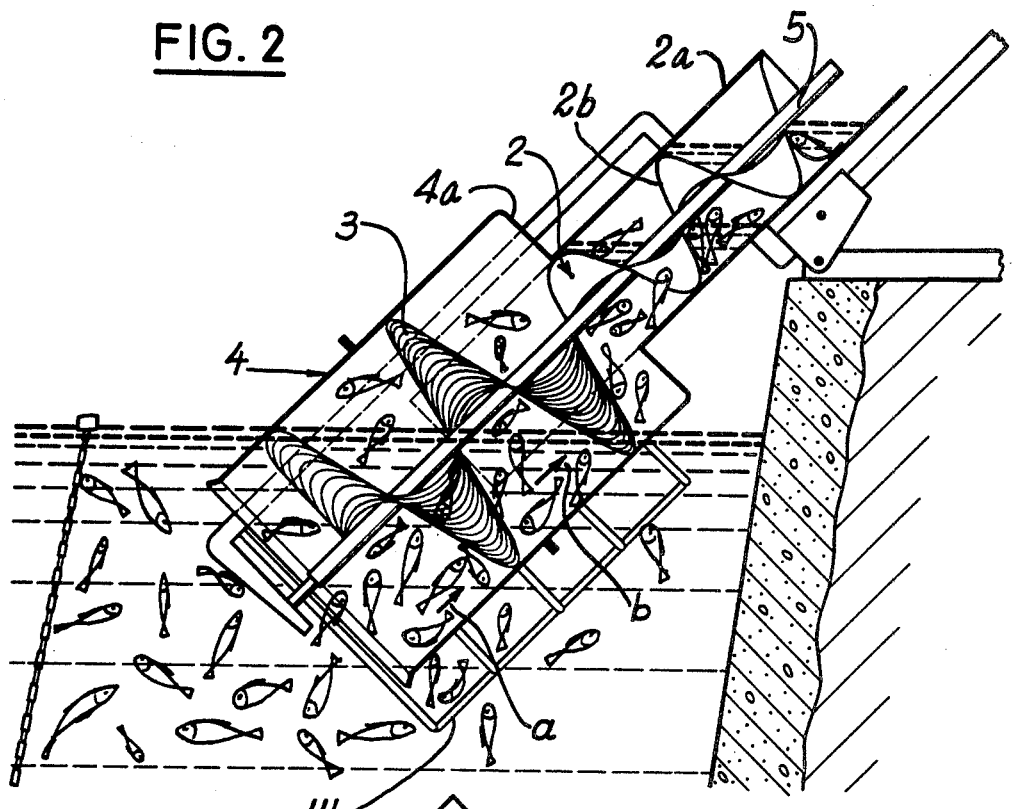
FIG. 2 is a partial axial section of FIG. 1.
Figure 3:
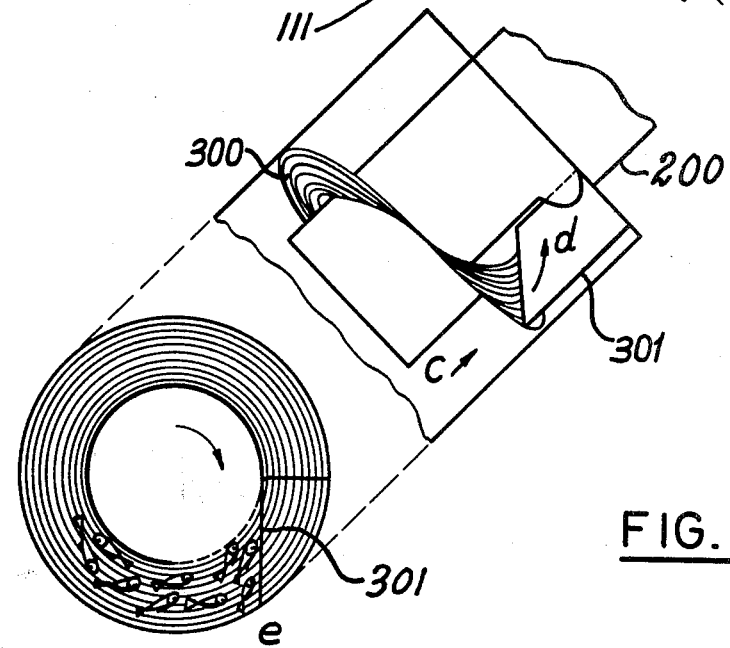
FIGS. 3, 3a, 3b are schematic views showing details of slightly modified apparatus.
Figure 3A:
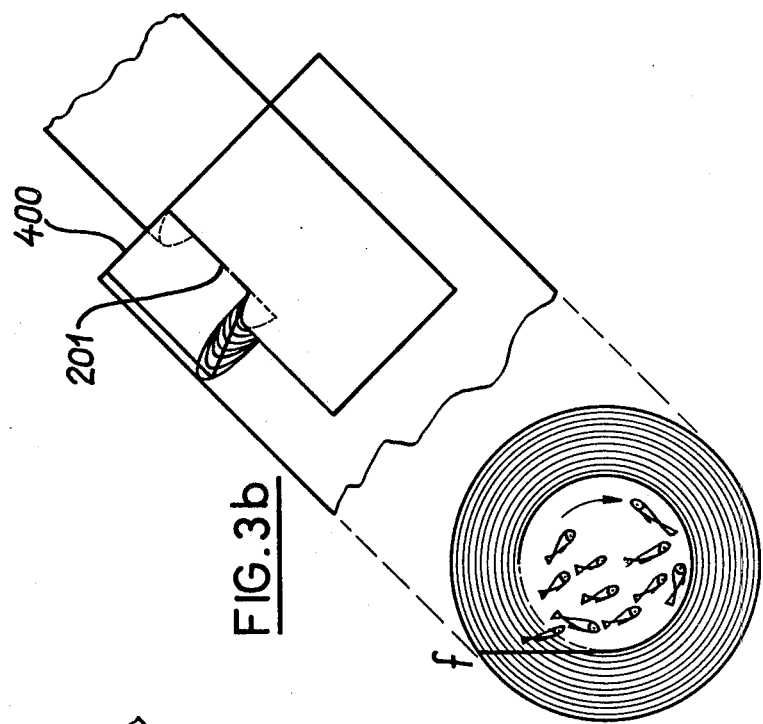
Figure 3B:
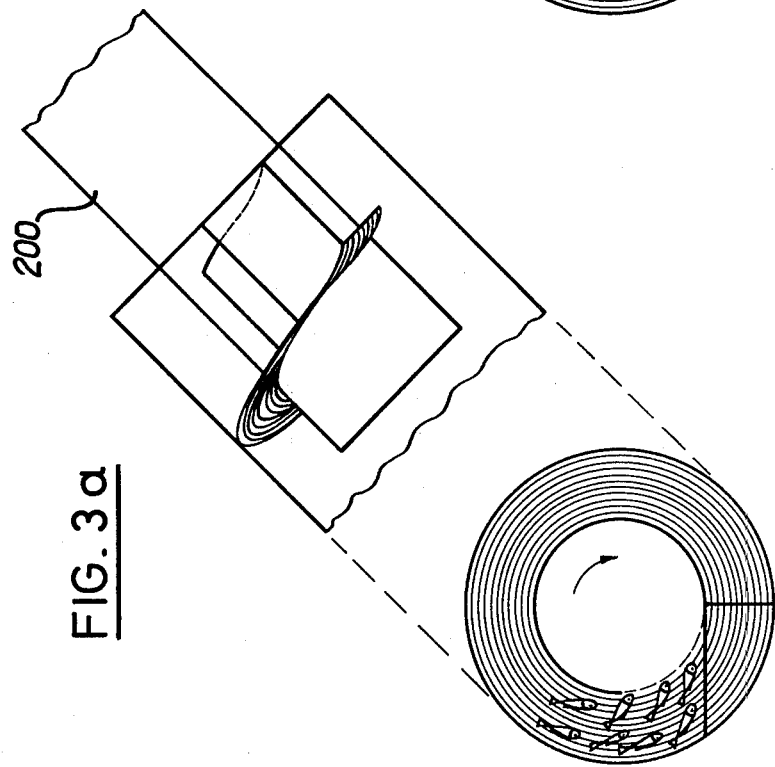

FIGS. 3, 3a and 3b show a modification in which the connecting region between the lifting screw and the catching screw extends over a certain length and in this region, the upper end of the lattice-work helices surround the lower end of the cylinder 200 of the lifting screw 2 which is provided with a suction orifice 201. An annular cover 400 closes the upper end of the drum 4 for protecting the screw 3 in its upper part. As in FIGS. 1 and 2, the helix 2b of the lifting screw 2 and the catching screw 3 are on a common shaft.

The last helix 300 of the lattice-work screw 3 terminates against a deflector 301 whose perimeter is defined by the inner wall of the drum 4, by the cover 400, by the outer wall of the cylinder 200 and by the lattice-work of the helix 300.

The aperture 201 in the cylinder 200 is provided in the region of the deflector 301 in order that the passage of the fish from the lattice-work catching screw 3 into the lifting screw 2 is free and obligatory.

If one takes the precaution of partially immersing this transition region, a certain quantity of water is introduced into the lifting screw which will facilitate the transfer and lifting of the fish, without the volume of water sucked in being considerable, as in known fish pumps.

A grille 111 fixed to the chassis 1 protects the drum 4.

Upon each turn of the helices, the fish caught by the screw 3 progress in the direction of the arrows (a)—(b)—(c), when it arrives at (d), it is located outside the casing 200 of the lifting screw. On coming into contact with the deflector 301, located at the end of the helix of the catching screw 3, at the lower point (e) of its revolution, the fish are entrained in the lifting screw and are forced to pass through the aperture 201.

In fact, pursuing its revolution from (e) to (f), the deflector 301 causes the fish to slide into the aperture 201 and they are all admitted to the lifting screw 2. A small amount of water is conveyed by the solid helices of the lifting screw and keeps the fish in an aqueous medium until they reach the outlet orifice 202 where they are guided by a flexible tube to the chosen destination, namely sorting, weighing, conveying tanks etc.

What is claimed is:

1. Apparatus for catching and lifting live fish, provided with transportation and positioning means, comprising rotatable in a common sheath, a catching screw having an open-work helix and extended by a lifting screw whose helix is solid, the two helices being rotated by a single shaft, and means at the junction point of said helices to facilitate the free passage of the fish from the lattice-work portion to the solid portion.

2. Catching apparatus according to claim 1, wherein said means are constituted by an aperture in the sheath of the solid helix screw and by a deflector on the last turn of the open-work helix.

3. Catching apparatus according to claim 2, wherein an upper portion of the open-work helix surrounds the lower part of the sheath of the solid helix as far as the level of the aperture bordered by the deflector.

4. Catching apparatus according to claim 1 wherein the open-work helix is surrounded by a drum of transluscent material.

5. Catching apparatus according to claim 4, wherein the upper end of said drum is closed by a cover around the sheath of the lifting screw.

6. Catching apparatus according to claim 5, wherein said cover is of transluscent material.

7. Catching apparatus according to claim 4, wherein said drum is protected by a grille fixed to a chassis.

8. Catching apparatus according to claim 1, wherein the transportation and positioning means are constituted by a frame supporting at least two bearings, itself supported by a carriage comprising an axle having wheels and, on either side of the sheath, two stabilization triangles having an apex close to the axle, a side for resting on the ground, a side of variable length allowing adjustment of the inclination of the screws, and a base provided at each corner with slides in which the frame slides.

9. Catching apparatus as claimed in claim 1, wherein the common sheath is of two different sections along its length.

* * * * *